(12) United States Patent
Gierer et al.

(10) Patent No.: US 7,611,002 B2
(45) Date of Patent: Nov. 3, 2009

(54) APPARATUS FOR THE OPERATION OF A HYDRODYNAMIC TORQUE CONVERTER AND A THEREWITH CORRESPONDING CONVERTER BYPASSING CLUTCH OF A TRANSMISSION APPARATUS

(75) Inventors: Georg Gierer, Kressbronn (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 398 days.

(21) Appl. No.: 11/704,863

(22) Filed: Feb. 9, 2007

(65) Prior Publication Data

US 2007/0187205 A1 Aug. 16, 2007

(30) Foreign Application Priority Data

Feb. 10, 2006 (DE) .................. 10 2006 006 179

(51) Int. Cl.
*F16D 33/00* (2006.01)
(52) U.S. Cl. ................... 192/3.3; 192/3.33
(58) Field of Classification Search ............ 192/3.29, 192/3.3, 3.33
See application file for complete search history.

(56) References Cited

U.S. PATENT DOCUMENTS

| | | | | | |
|---|---|---|---|---|---|
| 4,466,311 | A | * | 8/1984 | Hiramatsu | 477/169 |
| 4,880,090 | A | * | 11/1989 | Ando | 192/3.3 |
| 4,966,263 | A | * | 10/1990 | Hayasaki | 192/3.3 |
| 5,115,897 | A | * | 5/1992 | Yoshimura et al. | 477/65 |
| 6,374,973 | B1 | * | 4/2002 | Nobu et al. | 192/3.3 |
| 6,474,456 | B2 | * | 11/2002 | Suzuki et al. | 192/3.29 |
| 6,544,139 | B1 | | 4/2003 | Gierer et al. | |
| 7,100,753 | B1 | * | 9/2006 | Stafford | 192/3.3 |
| 2008/0173508 | A1 | * | 7/2008 | Gierer et al. | 192/3.3 |

FOREIGN PATENT DOCUMENTS

| | | |
|---|---|---|
| DE | 199 10 049 A1 | 9/1999 |
| DE | 198 58 541 A1 | 6/2000 |
| DE | 10 2004 024 379 | 12/2004 |
| DE | 10 2005 016 495 A1 | 10/2006 |

OTHER PUBLICATIONS

"Elektrohydraulische Steuerung und äuβere Schaltung des automatischen Getriebes W5A 330/580 von Mercedes-Benz", *Automobiltechnischen Zeitschrift 97* (1995), Nr. 10, pp. 698-706.

* cited by examiner

*Primary Examiner*—David D Le
*Assistant Examiner*—Justin Holmes
(74) *Attorney, Agent, or Firm*—Davis & Bujold, P.L.L.C.

(57) ABSTRACT

An apparatus for operating a hydrodynamic torque converter and a corresponding converter-bypass clutch of a transmission, having a solenoid valve communicating with a variable pressure control valve. The respective valve stem assembly thereof having surfaces which react to an application of hydraulic pressure. Each valve being controlled by a pilot pressure countering a spring arrangement. A spent fluid flow side of the torque converter communicates with a spent fluid flow aperture of the solenoid valve. The valve stem assembly related, to the solenoid valve is blocked by a supply aperture of the solenoid valve and is in operational connection with an auxiliary pressure control valve. A supply aperture of the variable pressure controller valve is connected with an operational pressure aperture of the pressure control valve, which can be connected with a piston space of the converter-bypass clutch, which pressurized hydraulic fluid can be applied.

11 Claims, 3 Drawing Sheets

APPARATUS FOR THE OPERATION OF A HYDRODYNAMIC TORQUE CONVERTER AND A THEREWITH CORRESPONDING CONVERTER BYPASSING CLUTCH OF A TRANSMISSION APPARATUS

This application claims priority from German Application Serial No. 10 2006 006 179.9 filed Feb. 10, 2006.

FIELD OF THE INVENTION

The invention concerns an apparatus for the operation of a hydrodynamic torque converter and a therewith corresponding converter-bypassing clutch of a transmission apparatus.

BACKGROUND OF THE INVENTION

The practice has much experience in constructing vehicles with acceleration elements which have been designed as hydrodynamic torque converters. In order to reduce the hydraulic losses in the zone of the hydrodynamic torque converter, or better, to eliminate such losses, a belief took hold of adding to the torque converter a so-called converter-bypass clutch. In the engaged condition of a converter-bypass clutch, a torque transfer will be bypassed around the converter into the drive string of a vehicle so equipped. The torque transfer is done principally with little loss by a restraining force based on a frictional grip resistance.

Fundamentally, two different system groups of acceleration arrangements are employed, which include a torque converter and a corresponding converter-bypass clutch.

In the case of a first system, the hydraulic activation of the converter-bypass clutch is integrally inserted into the hydraulic circuit of the corresponding hydraulic torque converter, where the first system becomes designated as a two-line converter. A converter clutch piston, which is provided for activation of the converter-bypass clutch and can be subjected to hydraulic pressure of such a two-line converter, is designed as a flexible disk, the hub of which is rotationally fixed to the turbine of the hydrodynamic torque converter.

When the converter-bypass clutch is disengaged, the converter clutch piston will receive pressure from a flow of hydraulic fluid leaving the inlet side of the hydrodynamic torque converter. The hydraulic stream flows in the direction of the back-flow side of the hydrodynamic torque converter. That is to say, the clutch piston is immersed in this flow. In order to engage the converter-bypass clutch, the inlet pressure of the of the hydrodynamic torque converter, principally, is reduced to zero, i.e., is so shifted, that an existing static total pressure in the hydrodynamic torque converter likewise drops to zero. The converter clutch piston, which is selectively placed in its closing direction of the converter-bypass clutch and is provided on that side which is remote from the hydrodynamic torque converter with a friction surfacing, in the last named operational situation of the hydrodynamic torque converter, is pressed by the spring device of the converter clutch piston against the housing of the pump-side of the hydrodynamic torque converter.

In order to increase the transfer capability of the converter-bypass clutch and therewith also to increase the transferable torque which can be directed over the converter-bypass clutch, the inlet pressure of the converter-bypass clutch is raised. The raising of the inlet pressure of the converter-bypass clutch increases the pressure of the converter clutch against the housing of the pump-side of the hydrodynamic torque converter. Conversely, in a case of an engaged converter-bypass clutch, the hydraulic fluid flow is diminished through the hydrodynamic converter to a predetermined minimum, so that essentially, the task of being a conventional, hydraulic, non-return check valve is thrust upon the piston of the converter bypass clutch.

To avoid a degradation of driving comfort, the converter-bypass clutch is advantageously engaged in such operational situations of the drive string, where disorders in the vehicle occur, which are detectable by the driver at least acoustically and are caused by rotational non-uniformities in the internal combustion motor being transferred without correction to the drive string. As a preventive measure thereagainst, it is attempted to achieve the goal of engaging in the quickest possible manner by the converter-bypass clutch for the reduction of the occurring hydraulic loss values in the hydrodynamic converter during an acceleration procedure.

DE 198 58 541 A1 makes known an electronic-hydraulic control apparatus of an automatically shifted motor vehicle, which includes an arrangement for the operation of an existing two-line converter designed as a first system group. That is to say, this would be a hydrodynamic torque converter and a corresponding converter-bypass clutch.

DE 10 2005 016 495.1 likewise teaches of a hydraulic control system for a two-line converter in which is exhibited a by-need activation of a two-line converter having a solenoid valve with a pressure control valve co-acting therewith. A control system of the cited invention is assembled with a solenoid valve and with a variable pressure control valve operationally connected thereto, where the valve disk thereof is designed with pressure reactant surfaces, resulting in having a pilot pressure, respectively, controllingly placed in opposition to a spring arrangement.

Additionally, the solenoid valve and the pressure control valve are equipped with a plurality of inlet or outlet control valves (hereinafter designated as "apertures", which are bound with control lines, where the control lines, for the purpose of supplying hydraulic fluid pressure to the torque converter and to the converter-bypass clutch, which pressure acts against the remote end faces of the aperture mechanisms, and whereby the control lines can be subsequently connected with both the torque converter and the converter-bypass clutch. A supply pressure aperture of the solenoid valve, which is subjected to pressure, can be brought into a working connection with an operational pressure aperture of the solenoid valve, which latter aperture is in communication with the inlet side of the torque converter.

Further, there exists a difference between a control space of the solenoid valve, which can be made to envelope the supply aperture, and the bordering, pressure-responsive surfaces of the valve stem of the solenoid valve, so that the through-flow through the torque converter can be regulated by disengaged converter-bypass clutch.

From *Automobiltechnischen Zeitschrift* (Journal of Automotive Technology) 97 (1995), No. 10, pp. 698-706, "Electro-hydraulic control and external shifting of the WSA 330/580 automatic transmission by Mercedes-Benz" discloses an apparatus for the operation of a forward acceleration arrangement with a hydrodynamic torque converter with a corresponding converter-bypass clutch. The activation of the converter-bypass clutch is separately laid out with respect to the hydraulic fluid circulation system of the torque converter. The piston space of the converter-bypass clutch is subjected to pressure from a control line, which is separated from the hydraulic fluid through-put zone of the torque converter and which control line employs that pressure which is necessary for the activation of the converter-bypass clutch, while the converter-bypass clutch, as in a two-line converter, is spatially integrated within the housing of the torque converter.

Forward acceleration movement apparatuses of this kind have been designated in practice as "three-line converters" and at present have been classified into the second system group.

This apparatus possesses, however, a system related disadvantage in that the pressure in the torque converter is opposed by the activation-pressure in the piston space of the converter-bypass clutch. This is true in the disengagement of the converter-bypass clutch. However, the pressure is undefined when the converter-bypass clutch is engaged. Hence, a desired transmission capability of the converter-bypass clutch by the above mentioned activation pressure during variations thereof in the torque converter, leads to poor uniformity in continuity of the output drive torque of under conditions which cannot be ameliorated, especially when exceeding the full operational range of the torque converter, all of which leads to reduced driving comfort.

By a wide margin, the embodiments for acceleration apparatuses, known to the practice, possess a torque converter and a corresponding converter-bypass clutch. In such cases, the clutch is hydraulically activated and is placed separately away from the torque converter. This assembly belongs to the second system group, where the converter-bypass clutch can be spatially distanced at an optionally selected position in the drive string of a vehicle. The clutch, in this position, for instance, can be employed as a shifting clutch or, alternately, as a brake within the housing of a transmission apparatus. Embodiments designed in this way exhibit an advantage over three-line converters in that the power transmission capability of the converter-bypass clutch is not supported by the internal pressure of the corresponding torque converter.

A disadvantage, however, lies in the fact that the torque converter can only be bypassed by the torque converter-by-pass clutch, which is spatially distanced from the torque converter by an extremely intensive design effort which, in the zone of the input zone of a transmission apparatus, additionally requires considerable measures regarding sealing of the transmission.

The present invention thus has the purpose of making an apparatus available for the operation of a hydrodynamic torque converter and a corresponding converter-bypass clutch by which a properly engineered, simply assembled, three-line converter can be operated without a reduction in driving comfort.

SUMMARY OF THE INVENTION

The inventive apparatus for the operation of a hydrodynamic torque converter and a corresponding converter-bypass clutch of a transmission apparatus consists of one solenoid valve and an operationally connected, variable pressure control valve; the valve plate of which possesses action surfaces to which hydraulic pressure can be applied and which the variable pressure valve is controllable with pilot pressure opposing a spring arrangement. In addition, the solenoid valve and the pressure control valve are equipped with a plurality of line-connected apertures.

The control lines are connectable with the torque converter and the converter-bypass clutch for the subjection of these elements to hydraulic pressure. The connections are established by the application of pressurized hydraulic fluid on their end faces, which are remote from the apertures. In the solenoid valve, a supply aperture, which is subjected to supply pressure, can be brought into a working connection with an operational pressure aperture of the solenoid valve on the inlet side of the torque converter. Additionally, there lies a spatial difference between neighboring active surfaces in a control space of the solenoid valve, which can be aligned with the pilot pressure aperture and also with the system pressure aperture of the solenoid valve. This spatial difference permits the possibility of regulating the through-flow through the torque converter.

According to the invention, a flow return side of the torque converter is bound with an exhaust aperture of the solenoid valve which aperture, in a case of valve stem side blocked supply pressure aperture, the aperture is connected to an auxiliary pressure control valve. In turn, a supply pressure aperture of the variable-pressure control valve can be connected with an operational system pressure aperture of the pressure control valve. In addition, the system pressure aperture can be connected with a piston space of the converter-bypass clutch. This action serves the purpose of activating the converter-bypass clutch with pressurized hydraulic fluid.

With the inventive apparatus, a three-line converter, which has been made in a non-complex manner and designed not to impair driving comfort, can be made fully operable, since the pressure in the interior of the torque converter both in the disengaged state of the converter-bypass clutch, while the flow through the torque converter is high because of the open supply aperture on the valve stem side as well as even in the engaged position of the converter-bypass clutch, when the flow through the torque converter is low, because the valve stem side blocked supply aperture on the valve stem side is closed can be controllingly regulated by the difference in pressure responsive surfaces in the area of the control space which can include the supply and operational pressure apertures or by the pressure regulation valve.

This means, that the pressure in the interior of the torque converter is a known factor over the entire operational range of the torque converter and the transmission capability of the converter-bypass clutch can be exactly adjusted in keeping with the condition of the driven vehicle without discontinuities arising in the output drive torque of the vehicle.

BRIEF DESCRIPTION OF THE DRAWINGS

The invention will now be described, by way of example, with reference to the accompanying drawings in which.

DETAILED DESCRIPTION OF THE INVENTION

Figure 1:
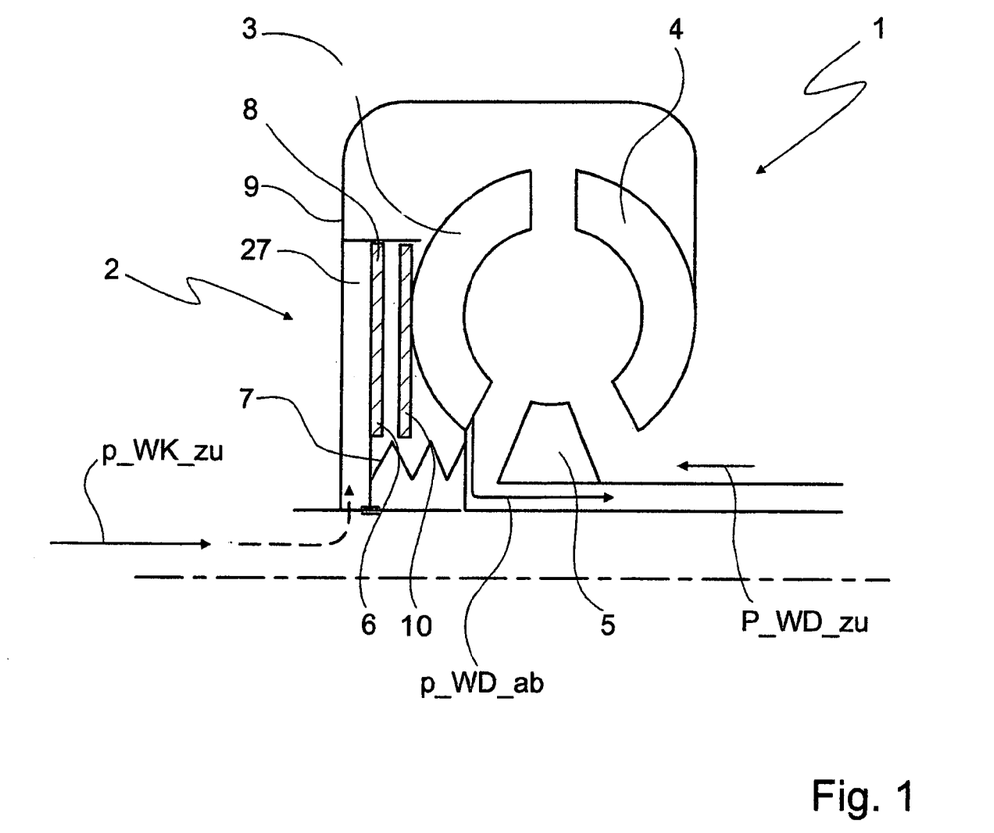
FIG. 1 is a schematic presentation of a three-line converter, designed as an acceleration apparatus of a drive string of a vehicle.

In FIG. 1 is shown a highly schematic presentation of a hydrodynamic torque converter 1 with a regulated converter-bypass clutch 2, which is assembled in a known way with a turbine rotor 3, a pump rotor 4 and a stator 5. Further, a converter-bypass clutch piston 6 is provided, which is rotationally fixed to a housing 9 of the torque converter 1. In addition, the converter clutch piston 6, in relation to the turbine rotor 3 is slidably, horizontally aligned in the axial direction, whereby an axial position of the converter clutch piston 6 can establish itself in relation to a spring arrangement 7, which is attached to the converter clutch piston 6 and acts counter to the engagement direction of the converter-bypass clutch 2. Further, the position of the converter clutch piston 6 is subject to an inlet pressure p_WD_zu of the torque converter 1 and an inlet pressure p_WK_zu regulating the converter-bypass clutch 2. In more detail, that is to say, that the above establishment is accomplished in relation to a single resultant these three named force components, namely the spring and two pressures, and the resultant exerts itself on the converter clutch piston 6.

In a case of an engaged converter-bypass clutch 2, the converter piston 6 assumes contact with a friction coating 8 placed on that side of the converter-bypass clutch 2, which is proximal to the turbine rotor 3, meeting against a second friction coating 10, which latter is rigidly bound to the turbine rotor 3. The result of this contact, is that the housing 9 becomes rotationally fixed to the pump rotor 4. In a contrary manner thereto, in a case of an disengaged converter-bypass clutch 2, the converter clutch piston 6 does not lie against the additional friction coating 10 of the turbine rotor 3.

The converter-bypass clutch 2 includes piston space 27, which is separately formed within the internal cavity of the torque converter 1. The existing acceleration assembly, here designated as a three-line converter and shown as an inventive apparatus 100 presented in FIG. 2, is designed to operate the torque converter 1 including the converter-bypass clutch 2, which clutch arrangement possesses a solenoid valve WDV, that hereinafter will also be designated as a converter pressure valve, and a variable pressure control valve WKV which, in turn, will be referred in the following as a converter clutch valve.

In operation, the torque converter 1 is subjected to the pressure of the inlet pressure p_WD_zu, which is regulated by the converter pressure valve WDV. At this event, the hydraulic fluid conducted through the torque converter 1, is directed from the torque converter 1 and has an exhaust pressure of p_WD_ab, which depends on the hydrodynamic ratios in the torque converter 1 with corresponding change in height.

Figure 2:
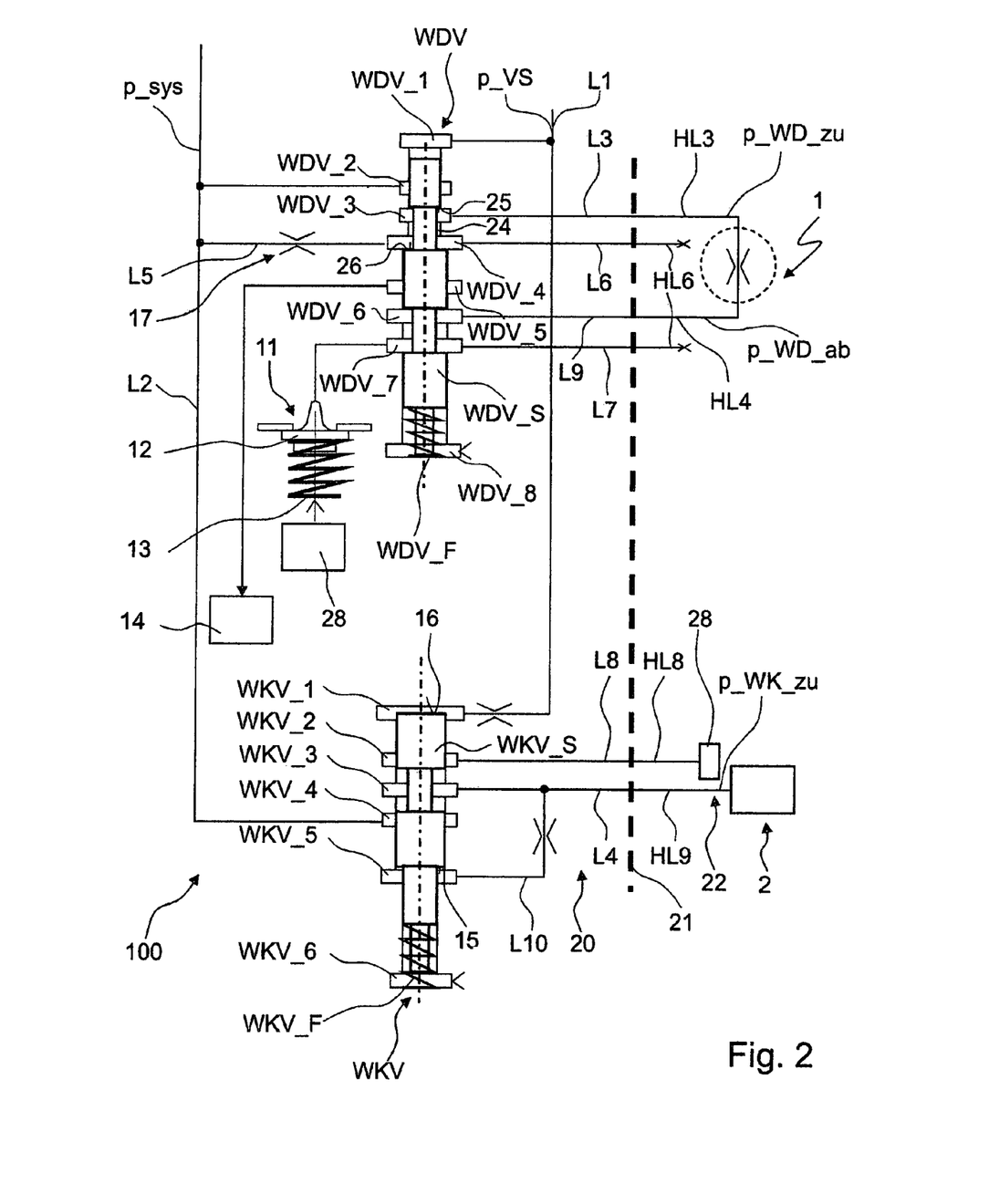
FIG. 2 is a very schematic outline diagram of the inventive apparatus, which is connected with a three-line converter.

In addition, the torque converter 1 in FIG. 2 is shown in a schematic format, serving as a throttling device, where the hydrodynamic torque converter 1 is designed to function over an entirely total operational range by the converter pressure valve WDV, which is controlled by the following: a plurality of apertures WDV_1 to WDV_8, a spring arrangement WDV_F and a valve stem WDV_S. The regulated converter-bypass clutch 2 is controlled over its full operational range by the converter clutch valve WKV which, likewise, is equipped with a plurality of apertures WKV_1 to WKV_6, a spring arrangement WKV_F and a valve stem WKV_S.

Figure 3:
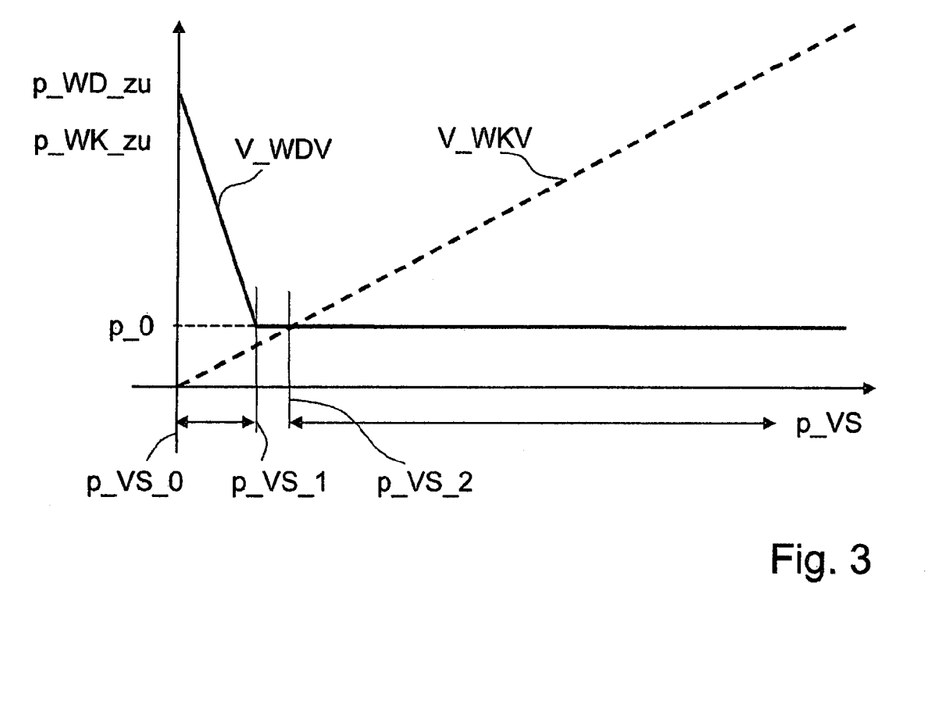
FIG. 3 is a valve-characteristic line of the solenoid valve and a valve characteristic line of the pressure variable pressure regulating valve of the inventive apparatus, namely of FIG. 2.

The converter pressure valve WDV and the converter clutch valve WKV are subjected to pressure by control line L1 of line-system 20, which is located on one of the sides of a system border limit 21 of the diagram 100 which side is proximal to the converter pressure valve WDV and to the converter clutch valve WKV from a pressure control valve (not further described) of a pilot system under an electrical transmission control apparatus (not further described) carrying a pilot pressure p_VS, which has been adjusted by a known method and applied on the end faces of the valve stem WDV_S and WKV_S, which stand in operational communication with the pilot pressure apertures WDV_1 and WKV_1, respectively, counter to the spring devices WDV_F and WKV_F. These devices are to be found in the spring-space apertures WDV_8 and WKV_6. This pressure delivery is carried out so that, dependent upon the existing pilot pressure p_VS, which is available through the control line L1 for the converter pressure valve WDV and, simultaneously, for the converter clutch valve WKV, now respectively the inlet pressure p_WD_zu of the torque converter 1 and the inlet pressure p_WK_zu of the converter-bypass clutch 2 can be adjusted in a known manner as depicted in FIG. 3. Additionally, the inlet pressures p_WD_zu and p_WK_zu are controllingly adjustable by a system pressure p_sys, which pressure is introduced through a major control line L2 of the line-system 20 under regulation of a pressure control valve in a known manner. This system pressure control valve is not detailed in the drawing, but adjusts the pressure to the "system pressure", namely p_sys by the converter valve WDV and the converter clutch valve WKV.

The system pressure p_sys is applied, through the control line L2, to a supply aperture WDV_2 of the converter valve WDV which, by a control line L3 of the line system 20 and by a hydraulic line HL3 of a hydraulic line system 22 of the total apparatus 100, which is placed on that side of the system border limit 21 at apparatus 100, which is remote from the converter pressure valve WDV and the converter clutch valve WKV, is brought into connection with input side of the torque converter 1. The exhaust path of the torque converter 1 is by a hydraulic line HL4 of the hydraulic line system 22 and is directed through a control line L9 of the line-system 20 and connected with an exhaust aperture WKV_6 of the converter valve WDV.

Additionally, the converter pressure valve WDV has an inlet aperture WDV_4, which is connected to control line L2 by a branch line L5. Flow in line L5 is controlled by an inserted throttle valve 17, so that the above converter pressure valve WDV can be subjected to a supply pressure which, in comparison to the system pressure p_sys, has been regulated to a desired level. A relief aperture WDV_7 of the converter pressure valve WDV stands in connection with an auxiliary pressure regulating valve 11 by which a predetermined pressure level p_0 is never fallen below in the line system 20 nor in the hydraulic line system 22 as seen in FIG. 2. The auxiliary pressure control valve 11 is defined as a plate valve, which possesses a disk 12 loaded by a spring arrangement 13, which works counter to the static pressure in the hydrodynamic torque converter 1.

Moreover, a lubrication and cooling oil aperture WDV_5 is connected to a schematically depicted lubrication and cooling circulation system 14 related to the transmission apparatus of the drive string. This has the purpose of supplying, when called for by the appropriate positioning of the valve stem WDV_S, the converter pressure valve WDV with the necessary lubrication and cooling means for the transmission components of the transmission apparatus.

The converter clutch valve WKV is designed with a relief aperture WKV_2 at a corresponding position of the sliding valve stem assembly WKV_S of the conveyor clutch valve WKV which, in turn, is connected with the operational pressure aperture WKV_3, and the operational pressure aperture WKV_3, through a combined control line L8/hydraulic line HL8, which crosses the system border limit 21, is thereby connected to a non-pressurized hydraulic reservoir 28.

A spent fluid aperture WDV_6 of the converter pressure valve, at a predetermined positioning of the sliding valve stem assembly WDV_S of the converter pressure valve, is connected with the relief aperture WDV_7 of the same. In this way, the hydraulic fluid flow from the spent fluid of the torque converter 1, which is moving in the direction of the converter pressure valve WDV, can be caused to flow through the hydraulic fluid line system 22 and the control line system 20 into a sump of a transmission apparatus, i.e., into the hydraulic fluid reservoir 28 located downstream of the auxiliary pressure control valve 11.

If the spent fluid aperture WDV_6 of the converter pressure valve WDV becomes blocked on the valve-stem-side to bar the release aperture WDV_7 of the converter pressure valve WDV and is bound with the lubrication and cooling oil aperture WDV_5 then, by the hydraulic flow through the torque converter 1 being run through the hydraulic line HL_4, the spent fluid aperture WDV_6 and the lubrication and cooling oil aperture WDV_5 become open to include the lubrication and cooling oil circuit 14, whereby the hydraulic fluid flowing from the torque converter 1 in the predetermined path therefrom, crosses twice over the system border line 20 between the line system 20 and the hydraulic system 22.

In the neighborhood of the control line system 20, there is a branch that exists at the system border 21 away from the aperture WKV_3 of the converter clutch valve WKV, which aperture is integral with a control line L4. This branching in the line L4 consists of an additional control line L10, which is connected with a spent fluid aperture WKV_5, also of the converter valve WKV. With these connections, the possibility exists that the spent fluid pressure $p\_WD\_ab$ of the torque converter 1 or the input pressure $p\_WK\_zu$ of the converter-bypass clutch 2, can exert its force at the spent fluid aperture WKV_5 at the valve stem WKV_S of the converter valve WKV. This exertion of force acts in opposition to the existing pilot pressure $p\_VS$ then pressurizing the sliding valve stem WKV_S of the variable pressure control valve WKV. There the input pressure $p\_WK\_zu$ of the converter-bypass clutch 2 is a simple type and adjustable manner.

In order to be able to control the inlet pressure $p\_WD\_zu$ of the torque converter while the converter-bypass clutch 2 is disengaged, the slidable valve stem WDV_S of the converter pressure valve WDV possesses a difference of area between, first, the interior of a control space 24 of the converter pressure valve WDV, which the control space can be brought into common action with supply aperture WDV_2 and with a pilot pressure aperture WDV_3 of the converter pressure valve WDV and, second, neighboring active surfaces 25, 26. By the area differences of the active surfaces 25 and 26 of the slidable valve stem assembly WDV_S of the converter pressure valve WDV, the inlet pressure $p\_WD\_zu$ to the torque converter 1 can be controlled during a disengaged position of the converter-bypass clutch 2 in a simple manner and with consideration given to the pilot pressure $p\_VS$ and the spring arrangement WDV_F of the converter valve WDV.

The converter-bypass clutch 2, when considered in relation to a supply aperture WKV_4 during a valve-stem-sided opened connection to the pilot pressure aperture WKV_3 of the converter clutch valve WKV, the opening made by the control line L4 and a hydraulic line HL9 of the hydraulic line system 22 of the inventive apparatus 100 connected to the control line L4 in proximity to the system border 21 is directly connected to the piston space 27 of the converter-bypass clutch 2.

A control line L6 and a control line L7 of the line system 20 of the inventive apparatus 100 are presented as so-called blind-end lines. These lines are closed, on that side of the system border 21, which is remote from the line system 20, but lies in area of the hydraulic line system 22.

The control line L8, which is connected with the relief aperture WKV_2 of the converter clutch valve WKV in the area of the system border 21, is connected with the hydraulic line HL8 and stands in connection with the non-pressured hydraulic reservoir 28, which is also the oil sump of a transmission apparatus, and is located downstream of the auxiliary pressure control valve 11. This arrangement allows a pressure reduction, if in a controlled operation, in the converter clutch valve WKV, an inlet pressure $p\_WK\_zu$ shows too great a pressure at the converter-bypass clutch 2 through the valve stem side opening of the connection between the operational pressure aperture WKV_3 and the relief aperture WKV_2 of the converter clutch valve WKV in the direction of the hydraulic fluid reservoir 28.

In FIG. 3 is to be found a characteristic valve curve V_WDV of the converter pressure valve WDV and a characteristic valve curve V_WKV of the converter clutch valve WKV of the inventive apparatus 100 during control of the hydrodynamic torque converter 1 and the corresponding converter-bypass clutch 2 (according to with FIG. 1) which, on the basis of the positioning of the auxiliary pressure control valve 11, is placed downstream of the relief aperture WDV_7 of the converter pressure valve WDV. With this arrangement, the increasing characteristic curves, namely V_WDV and V_WKV of the respective converter pressure valve WDV and the converter clutch valve WKV represent the inlet pressures $p\_WD\_zu$ and $p\_WK\_zu$, again, the respective torque converter 1 and the converter-bypass clutch 2.

The characteristic valve curve V_WKV of the converter clutch valve WKV of the inventive apparatus 100, possesses over the entire pilot pressure range a proportional relation to pilot pressure $p\_VS$, where the input pressure $p\_WK\_zu$ of the converter-bypass clutch 2 corresponds, when initiated from a first pilot pressure value of $p\_VS\_0$, which approaches at least the value of zero, increases from a minimal control pressure in the piston space 27 of the converter-bypass clutch 2 linearly toward a maximum pressure value.

At the first pilot pressure value $p\_VS\_0$, the inlet pressure $p\_WD\_zu$ of the torque converter 1 exhibits a maximum pressure value. Between a second pilot pressure value, $p\_VS\_1$ and a first pilot pressure value $p\_VS\_0$, the inlet pressure $p\_WD\_zu$ of the torque converter 1 declines from the exhibited maximum value to a pressure level $p\_0$, which is set by the auxiliary pressure regulating valve 11. Subsequently, the curve of the characteristic valve line V_WDV of the converter torque valve WDV remains constant at the value $p\_0$.

The level of pressure, designated as $p\_0$, which is set by the auxiliary pressure control valve 11 in the line system 20 of the inventive apparatus 100, so acts that air dissolved in the hydraulic fluid remains dissolved and cavitation is thus avoided throughout the entire operational range of the torque converter 1.

By the placement of the auxiliary pressure control valve 11 between the pressure-free hydraulic reservoir 28, which is also the oil sump of a transmission apparatus, and the converter pressure control valve WDV, the inlet pressure $p\_WD\_zu$ of the torque converter 1 declines, but only to the established limit of pressure $p\_0$.

The level of pressure designated as $p\_0$ is related, as far as the line system 20 is concerned, with the active surface of the valve stem plate 12, which is subjected to hydraulic pressure and also with spring force of the spring arrangement 13 of the pressure control valve 11. Accordingly, the level of pressure $p\_0$ can be altered according with changes in these given parameters as such changes may be called for by the operational conditions of the inventive apparatus 100.

Subsequently, the method of functioning of the inventive apparatus 100, according with FIG. 2, and in relation with the presentation, according to FIG. 3, will be described and explained in greater detail with a starting base at the first pilot pressure value $p\_VS\_0$, which defines the ordinate of FIG. 3.

Upon the application of the first pilot pressure value, $p\_VS\_0$, the valve stem assembly WDV_S of the converter pressure valve WDV is retracted by the spring arrangement WDV_F to slide the valve stem assembly WDV_S in an opposite direction to that otherwise forced by the pilot pressure $p\_VS$. Consequently, the inlet pressure $p\_WD\_zu$ of the hydrodynamic torque converter 1 achieves a maximum value. This results from the fact, that the system pressure p_sys by the valve stem assembly WDV_S of the converter pressure valve WDV, in its fully non-extended position, is set by the converter pressure valve WDV at a maximum pressure value, which is allowed by the difference in areas between the active surfaces 25 and 26 of the valve stem assembly WDV_S and the spring force of the spring arrangement WDV_F of the converter pressure valve WDV.

Simultaneously, the relief aperture WDV_7 is separated from the spent flow aperture WDV_6 of the converter pressure valve WDV in the position of pressure regulation of the valve stem assembly WDV_S with the result that a back-flow of the torque converter 1 becomes separated from the non-pressurized oil sump 28, which is placed downstream of the auxiliary pressure control valve 11. The pressure control in the area of a pilot pressure aperture WDV_3 of the converter pressure valve WDV occurs by the so-called modulation-control-edges between the supply aperture WDV_2 and the inflow aperture WDV_4, whereby the pressure in the area of the operational pressure aperture WDV_3 is greater than the predetermined pressure level p_0 set by the auxiliary pressure control valve 11.

Since the converter clutch valve WKV is completely retracted upon the application of the first pilot pressure value p_VS_0 by the spring arrangement WKV_F, which said spring is attached to the valve stem assembly WKV_S and the applied pressure p_WK_zu of the converter-bypass clutch WKV, which is directed at an active surface 15 of the valve stem assembly WKV_S of the converter-bypass clutch WKV, then the supply aperture WKV_4, separated from the pilot pressure aperture WKV_3 of the converter clutch valve WKV, and the applied system pressure p_sys by the control line L2 of the line system 20 at the converter clutch valve WKV is not conducted in the direction of the controlled converter-bypass clutch 2.

With increasing pilot pressure p_VS, both the valve stem assembly WDV_S of the converter pressure valve WDV, as well as the valve stem assembly WKV_S of the converter clutch valve WKV, are so moved counter to the applied force—which is dependent upon the given spring-rate—of the spring arrangement WDV_F/WKV_F acting on the valve stem assembly WDV_S/WKV_S plus the force of the inlet pressure p_WK_zu of the converter-bypass clutch 2 acting on the valve stem assembly WKV_S of the converter-bypass clutch 2, that the inlet pressure p_WK_zu of the converter-bypass clutch 2 is changed as shown in FIG. 3.

Since the converter clutch piston 6 is biased by a spring-force counter to the engagement direction of the converter-bypass clutch 2 by the spring arrangement 7, then to accomplish the engagement of the converter-bypass clutch 2, it is necessary to establish an inlet pressure p_WK_zu of the converter-bypass clutch 2 in the piston space 27, which gives a pressure which exceeds the sum of the spring force of the spring arrangement 7 of the converter-bypass clutch 2 plus the interior pressure of the torque converter 1, since the converter clutch piston 6 is subjected to the existing hydraulic pressure in the interior of the torque converter 1 to act in the opening direction of the converter-bypass clutch 2.

On this basis, the friction coating 8 of the converter clutch piston 6 presently lies, immediately upon reaching the second pilot pressure p_VS_1 against the second friction coating 10, where the converter-bypass clutch 2 can contribute essentially no torque to this pilot pressure value. With an increasing climb of the pilot pressure p_VS and the accompanying increase of the inlet pressure p_WK_zu of the converter-bypass clutch 2, the converter-bypass clutch 2 would increasingly engage, where the converter-bypass clutch 2, at an achieved pilot pressure value p_VS_2 is engaged and torque can be transmitted by the converter-bypass clutch 2. With additionally increasing pilot pressure, namely p_VS, the torque transfer capability of the converter-bypass clutch 2 likewise increases up to the point where its full transfer capability is attained.

REFERENCE NUMERALS 1 hydrodynamic torque converter
2 regulated converter-bypass clutch
3 turbine rotor
4 pump rotor
5 stator
6 converter-bypass clutch piston
7 spring arrangement for converter-bypass clutch
8 first friction coating
9 housing
10 second friction coating
11 auxiliary pressure control valve
12 disk in valve
13 spring in valve 11
14 lubrication and/or cooling oil circulation system
15 active surface
16 end face of the valve stem of the converter clutch valve
17 valve, with throttling effect, i.e., "Throttle"
20 line system
21 border limit of apparatus 100
22 hydraulic line system
24 control space
25, 26 active surfaces of the valve stem of the converter pressure valve
27 piston space (see FIG. 1)
28 hydraulic fluid reservoir
100 inventive apparatus
HL3, HL4
HL6, HL8,
HL9 hydraulic lines
L1 to L10 control lines
p_0 pressure level
p_sys system pressure
p_VS pilot pressure. This is an initial, preset controlled pressure.
p_VS_0 to
p_VS_2 the value of the above said pilot pressure
p_WD_zu feed (zu) pressure to torque converter
p_WD-ab exhaust (ab) pressure of torque converter
p_WK_zu feed pressure of the converter-bypass clutch
V_WDV valve curve
V_WKV valve curve
WDV converter pressure valve, also referred to as "solenoid valve"
WDV_1 to
WDV_8 control apertures
WDV_F spring arrangement
WDV_S valve stem
WKV converter clutch valve
WKV_1 to
WKV_6 control apertures
WKV_F spring arrangement
WKV_S valve stem assembly

The invention claimed is:
1. An apparatus (100) for operating a hydrodynamic torque converter (1) and a corresponding converter-bypass clutch (2) of a transmission, the apparatus comprising:

a solenoid valve (WDV) having a valve stem assembly (WDV_S) with a surface which reacts to a pilot pressure (p_VS), the solenoid valve (WDV) being controlled by the pilot pressure (p_VS) which biases a spring arrangement (WDV_F);

a variable pressure control valve (WKV) having a valve stem assembly (WKV_S) with a surface which reacts to the pilot pressure (p_VS), the variable pressure control valve (WKV) being controlled by the pilot pressure (p_VS) which biases spring arrangement (WKV_F), the solenoid valve (WDV) and the pressure control valve (WKV) being operably connected;

the solenoid valve (WDV) and the pressure control valve (WKV) each have a plurality of apertures (WDV_1-WDV_8, WKV_1-WKV_6), and each of the plurality of apertures (WDV_1-WDV_8, WKV_1-WKV_6) communicating with one or more control lines (L1 to L10);

at least one of the one or more of the control lines (L1-L10) communicates with the torque converter (1) and the converter-bypass clutch (2) to apply pressurized hydraulic fluid to end areas of the torque converter (1) and the converter-bypass clutch (2) remote from the plurality of apertures (WDV_1 to WDV_8, WKV_1 to WKV_6);

a second supply aperture (WDV_2) of the solenoid valve (WDV) is subjected to system pressure (p_sys), via a first control line (L2), and is connected to an input side of the torque converter (1) of the solenoid valve (WDV);

a surface between a control space (24) of the solenoid valve (WDV), which is connected with the second supply aperture (WDV_2), and a first adjacent active surface (25) of the valve stem assembly (WDV_S) of the solenoid valve (WDV), has a surface area different than a surface between the control space (24) of the solenoid valve (WDV) and a second adjacent active surface (26) of the valve stem assembly (WDV_S) of the solenoid valve (WDV);

a flow return side of the torque converter (1) communicates with a sixth flow return aperture (WDV_6) of the solenoid valve (WDV), a valve stem assembly associated with the solenoid valve (WDV) is blocked by the second supply aperture (WDV_2) of the solenoid valve (WDV) and communicates with an additional pressure control valve (11);

a fourth supply aperture (WKV_4), of the variable pressure control valve (WKV), communicates with a third pilot pressure aperture (WKV_3) of the pressure control valve (WKV) which communicates with a piston space (27) of the converter-bypass clutch (2), the third pilot pressure aperture (WKV_3) of the pressure control valve (WKV) communicates with the converter-bypass clutch (2) when the piston space (27) of the converter-bypass clutch (2) is pressurized with hydraulic fluid; and the third pilot pressure aperture (WKV_3) of the variable pressure control valve (WKV) communicates with a fifth flow return aperture (WKV_5) of the pressure control valve (WKV) so that the pilot pressure (p_VS), exerted against the valve stem assembly (WKV_S) at a first pilot pressure aperture (WKV_1) of the pressure variable control valve (WKV), is subjected to an oppositely effective pressure.

2. The apparatus according to claim 1, wherein the solenoid valve (WDV) has a lubrication and cooling oil aperture (WDV_5) to supply a lubrication and cooling oil circulation system (14) of a transmission apparatus with a lubrication and coaling oil, the lubrication and cooling oil circulation system (14) is located downstream of the solenoid valve (WDV).

3. The apparatus according to claim 2, wherein the sixth return flow aperture (WDV_6) of the solenoid valve (WDV), relative to positioning of the valve stem assembly (WDV_S) of the solenoid valve (WDV), is connected to a seventh return flow aperture (WDV_7) of the solenoid valve (WDV) in case of a valve stem related, blocked connection between the second supply aperture (WDV_2) and the third pilot pressure aperture (WDV_3) of the solenoid valve (WDV) and conversely, the sixth return flow aperture (WDV_6) of the solenoid valve (WDV), relative to the positioning of the valve stem assembly (WDV_S) of the solenoid valve (WDV) is connected with the lubrication and cooling oil aperture (WDV_5) in case of a valve stem related, open connection between the supply aperture (WDV) of the solenoid valve (WDV).

4. The apparatus according to claim 3, wherein the seventh return flow aperture (WDV_7) of the solenoid valve (WDV) is connected with a hydraulic reservoir (28), and an auxiliary pressure control valve (11) is located between the seventh return flow aperture (WDV_7) and the hydraulic reservoir (28) for adjusting of a minimal pressure in the torque converter (1).

5. The apparatus according to claim 1, wherein the third pilot pressure aperture (WKV_3) of the variable pressure controller valve (WKV), upon a valve stem related blockage between the fourth supply aperture (WKV_4) and the third pilot pressure aperture (WKV_3), is connected with a relief aperture (WKV_2) of the variable pressure control valve (WKV).

6. The apparatus according to claim 5, wherein the connection between the third pilot pressure aperture (WKV_3) and the second relief aperture (WKV_2) of the variable pressure control valve (WKV) is blocked by way of the valve stem (WKV_S) when there is a valve stem related open connection between the fourth supply aperture (WKV_4) and the third pilot pressure aperture (WKV_3) of the variable pressure control valve (WKV).

7. The apparatus according to claim 1, wherein the solenoid valve (WDV) has an fourth inlet aperture (WDV_4), which is subjected to a supply pressure by a throttle valve (17), the supply pressure being supplied to the second supply aperture (WDV_2) of the solenoid valve (WDV).

8. The apparatus according to claim 7, wherein the fourth input aperture (WDV_4) of the solenoid valve (WDV) communicates with a return fluid aperture upon blockage of a valve stem assembly between the second supply aperture (WDV_2) and the third pilot pressure aperture (WDV_3) of the solenoid valve (WDV) and upon a simultaneous blockage of the valve stem assembly between the sixth return flow aperture (WDV_6) and the seventh return flow aperture (WDV_7) of the solenoid valve (WDV) with the sixth return flow aperture (WDV_6) of the solenoid valve (WDV) in connection.

9. The apparatus according to claim 3, wherein a second control line (L7), which communicates with the seventh return flow aperture (WDV_7) of the solenoid valve (WDV) of a line system (20), is blocked in an area of a hydraulic line system (22).

10. An apparatus (100) for operating a hydrodynamic torque converter (1) and a corresponding converter-bypass clutch (2) of a transmission, the apparatus comprising:

a solenoid valve (WDV) having a valve stem assembly (WDV_S) with a surface which reacts to a pilot pressure (p_VS), the solenoid valve (WDV) being controlled by the pilot pressure (p_VS) which biases a spring arrangement (WDV_F);

a variable pressure control valve (WKV) having a valve stem assembly (WKV_S) with a surface which reacts to the pilot pressure (p_VS), the variable pressure control valve (WKV) being controlled by the pilot pressure (p_VS) which biases spring arrangement (WKV_F), the solenoid valve (WDV) and the pressure control valve (WKV) being operably connected;

the solenoid valve (WDV) and the pressure control valve (WKV) each have a plurality of apertures (WDV_1-WDV_8, WKV_1-WKV_6), and each of the plurality of apertures (WDV_1-WDV_8, WKV_1-WKV_6) communicating with one or more control lines (L1 to L10);

at least one of the or more of the control lines (L1-L10) communicates with the torque converter (1) and the converter-bypass clutch (2) to apply pressurized hydraulic fluid to end areas of the torque converter (1) and the converter-bypass clutch (2) remote from the plurality of apertures (WDV_1 to WDV_8 WKV_1 to WKV_6);

a second supply aperture (WDV_2) of the solenoid valve (WDV) is subjected to system pressure (p_sys), via a first control line (L2), and is connected to an input side of the torque converter (1) of the solenoid valve (WDV);

a surface between a control space (24) of the solenoid valve (WDV), which is connected with the second supply aperture (WDV_2), and a first adjacent active surface (25) of the valve stem assembly (WDV_S) of the solenoid valve (WDV), has a surface area different than a surface between the control space (24) of the solenoid valve (WDV) and a second adjacent active surface (26) of the valve stem assembly (WDV_S) of the solenoid valve (WDV);

a flow return side of the torque converter (1) communicates with a sixth flow return aperture (WDV_6) of the solenoid valve (WDV), a valve stem assembly associated with the solenoid valve (WDV) is blocked by the second supply aperture (WDV_2) of the solenoid valve (WDV) and communicates with an additional pressure control valve (11);

a fourth supply aperture (WKV_4), of the variable pressure control valve (WKV), communicates with a third pilot pressure aperture (WKV_3) of the pressure control valve (WKV) which communicates with a piston space (27) of the converter-bypass clutch (2), the third pilot pressure aperture (WKV_3) of the pressure control valve (WKV) communicates with the converter-bypass clutch (2) when the piston space (27) of the converter-bypass clutch (2) is pressurized with hydraulic fluid; and the third pilot pressure aperture (WKV_3) of the variable pressure controller valve (WKV), upon a valve stem related blockage between the fourth supply aperture (WKV_4) and the third pilot pressure aperture (WKV_3), is connected with a relief aperture (WKV_2) of the variable pressure control valve (WKV).

11. An apparatus (100) for operating a hydrodynamic torque converter (1) and a corresponding converter-bypass clutch (2) of a transmission, the apparatus comprising:

a solenoid valve (WDV) having a valve stem assembly (WDV_S) with a surface which reacts to a pilot pressure (p_VS), the solenoid valve (WDV) being controlled by the pilot pressure (p_VS) which biases a spring arrangement (WDV_F);

a variable pressure control valve (WKV) having a valve stem assembly (WKV_S) with a surface which reacts to the pilot pressure (p_VS), the variable pressure control valve (WKV) being controlled by the pilot pressure (p_VS) which biases spring arrangement (WKV_F), the solenoid valve (WDV) and the pressure control valve (WKV) being operably connected;

the solenoid valve (WDV) and the pressure control valve (WKV) each have a plurality of apertures (WDV_1-WDV_8, WKV_1-WKV_6), and each of the plurality of apertures (WDV_1-WDV 8, WKV_1-WKV_6) communicating with one or more control lines (L1 to L10);

at least one of the one or more of the control lines (L1-L10) communicates with the torque converter (1) and the converter-bypass clutch (2) to apply pressurized hydraulic fluid to end areas of the torque converter (1) and the converter-bypass clutch (2) remote from the plurality of apertures (WDV_1 to WDV_8, WKV_1 to WKV_6);

a second supply aperture (WDV_2) of the solenoid valve (WDV) is subjected to system pressure (p_sys), via a first control line (L2), and is connected to an input side of the torque converter (1) of the solenoid valve (WDV);

a surface between a control space (24) of the solenoid valve (WDV), which is connected with the second supply aperture (WDV_2), and a first adjacent active surface (25) of the valve stem assembly (WDV_S) of the solenoid valve (WDV), has a surface area different than a surface between the control space (24) of the solenoid valve (WDV) and a second adjacent active surface (26) of the valve stem assembly (WDV_S) of the solenoid valve (WDV);

a flow return side of the torque converter (1) communicates with a sixth flow return aperture (WDV_6) of the solenoid valve (WDV)I a valve stem assembly associated with the solenoid valve (WDV) is blocked by the second supply aperture (WDV_2) of the solenoid valve (WDV) and communicates with an additional pressure control valve (11);

a fourth supply aperture (WKV_4), of the variable pressure control valve (WKV), communicates with a third pilot pressure aperture (WKV_3) of the pressure control valve (WKV) which communicates with a piston space (27) of the converter-bypass clutch (2), the third pilot pressure aperture (WKV_3) of the pressure control valve (WKV) communicates with the converter-bypass clutch (2) when the piston space (27) of the converter-bypass clutch (2), is pressurized with hydraulic fluid; and the solenoid valve (WDV) has an fourth inlet aperture (WDV_4), which is subjected to a supply pressure by a throttle valve (17), the supply pressure being supplied to the second supply aperture (WDV_2) of the solenoid valve (WDV).

* * * * *